United States Patent [19]

Takahashi

[11] Patent Number: 4,956,660
[45] Date of Patent: Sep. 11, 1990

[54] FOCUS DETECTING APPARATUS FOR CAMERA

[75] Inventor: Yoshiharu Takahashi, Hachioji, Japan

[73] Assignee: Konica Corporation, Tokyo, Japan

[21] Appl. No.: 456,620

[22] Filed: Dec. 28, 1989

Related U.S. Application Data

[63] Continuation of Ser. No. 215,855, Jul. 6, 1988, abandoned.

[30] Foreign Application Priority Data

Jul. 7, 1987 [JP] Japan ................................ 62-167716
Jul. 7, 1987 [JP] Japan ................................ 62-167717

[51] Int. Cl.$^5$ ............................................. G03B 13/36
[52] U.S. Cl. .................................... 354/402; 354/408
[58] Field of Search ................. 354/400, 402, 408

[56] References Cited

U.S. PATENT DOCUMENTS

| | | | |
|---|---|---|---|
| 4,559,446 | 12/1985 | Suzuki | ................................ 354/408 |
| 4,716,434 | 12/1987 | Taniguchi et al. | ................... 354/408 |
| 4,766,302 | 8/1988 | Ishida et al. | ........................... 354/408 |
| 4,800,410 | 1/1989 | Akaghi et al. | ........................ 354/408 |

Primary Examiner—Russell E. Adams
Attorney, Agent, or Firm—Finnegan, Henderson, Farabow, Garrett, and Dunner

[57] ABSTRACT

A focus detecting apparatus for a camera, includes first and second light-receiving units, and a correlation detecting unit. The first and second light-receiving units receive first and second images formed by light bundle received from an object to be photographed through first and second portions of a photographing lens divided by a face including an optical axis thereof, and output image signals corresponding to light distribution patterns of the images, respectively. The correlation detecting unit detects portions having the highest correlation degree of the two images in accordance with the image signals. The focus detecting apparatus for a camera performs focus detection of the photographing lens on the basis of a detection result of the correlation detecting unit. The correlation detecting unit detects the portions having the highest correlation degree using at least two different methods.

7 Claims, 4 Drawing Sheets

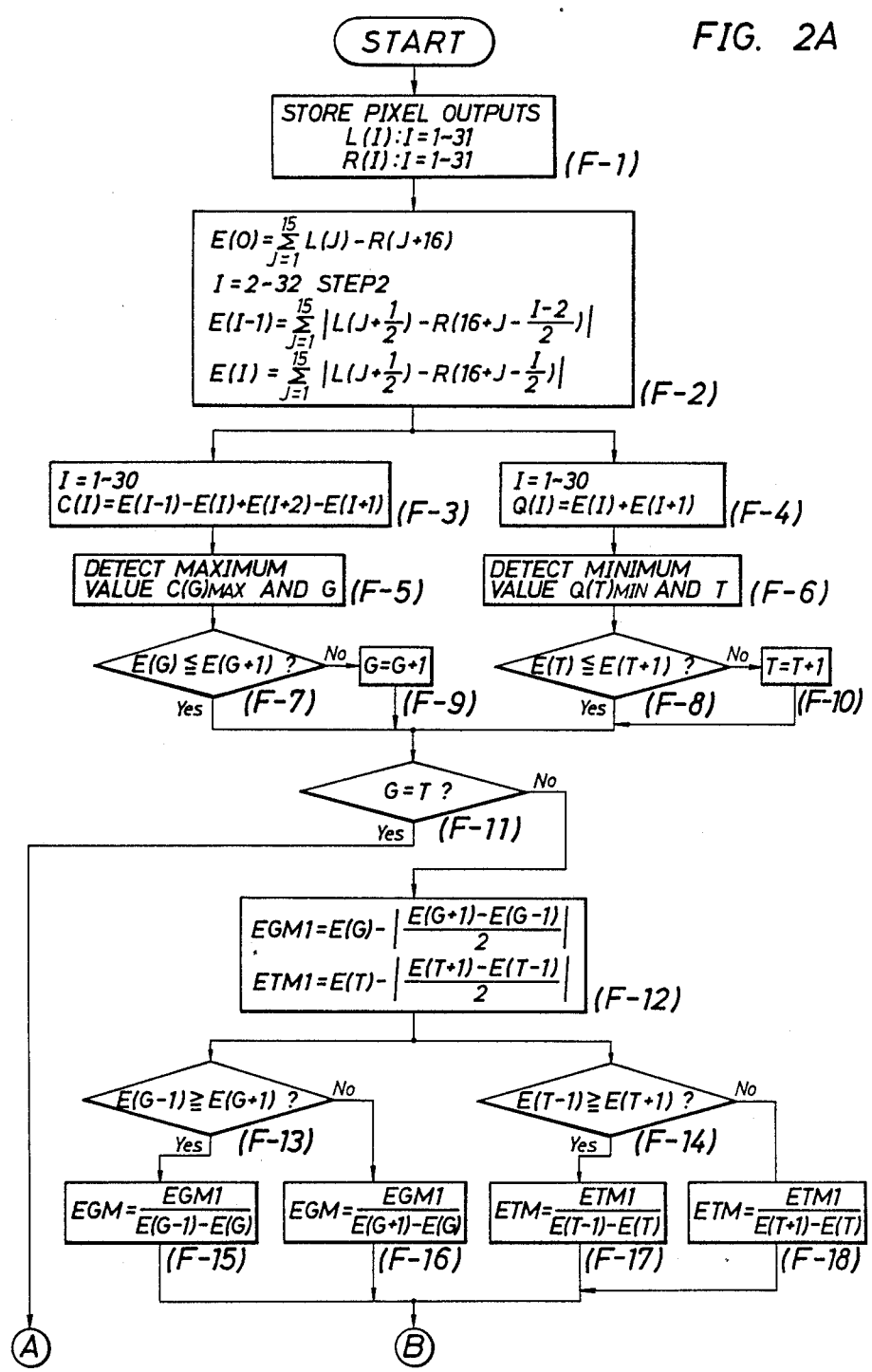

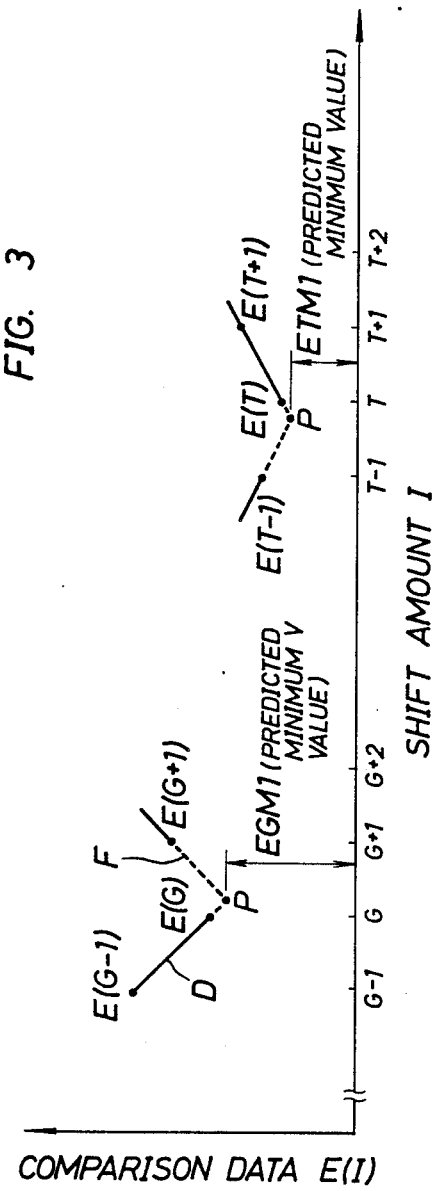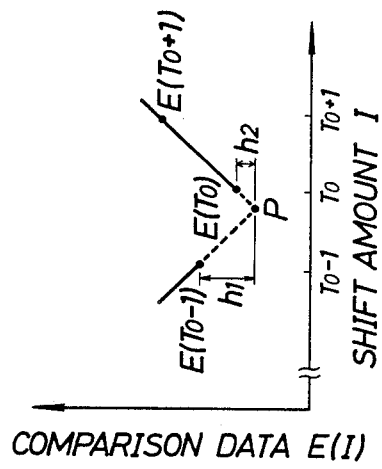

FOCUS DETECTING APPARATUS FOR CAMERA

This application is a continuation of application Ser. No. 215,855, filed July 6, 1988 (not abandoned.

BACKGROUND OF THE INVENTION

1. Field of the Invention

The present invention relates to a focus detecting apparatus for a camera according to a phase difference system.

2. Description of the Prior Art

A focus detecting apparatus is used for auto-focusing (automatic focusing) of a camera, and various types of the apparatus are conventionally known.

In a single-lens reflex camera, a phase difference system is often used in which two images are focused on an image sensor by a light beam received from an object to be photographed through a photographing lens, and an offset amount between an image interval of the two images and that obtained in an in-focus state is detected, thereby obtaining a defocus amount of the photographing lens.

In this system, portions of the two images having the highest correlation degree are obtained, and the defocus amount is calculated on the basis of the image interval between these portions. That is, correlation calculation is performed such that a difference between image signals of the two images is obtained in units of corresponding pixel outputs while a pixel of the image sensor is shifted one by one and a total sum of the differences is calculated. It is assumed that data calculated in this manner (to be referred to as "comparison data" hereinafter) is minimized at a position at which the two images are completely superposed on each other. Therefore, a position at which the comparison data is minimized has the highest correlation degree. The defocus amount can be obtained in accordance with an amount of shifting of the image pixel (to be referred to as a "shift amount" hereinafter). That is, if a shift amount obtained when the comparison data is minimized is preset to be a shift amount A in an in-focus state, an offset amount between the image intervals is obtained as a difference between the shift amount obtained when the comparison data is minimized and the shift amount A in the in-focus state. Therefore, the defocus amount can be obtained in accordance with the offset amount (Japanese Patent Laid-Open No. 60-243618).

However, according to a method in which only one portion having a high correlation degree is detected, if an object to be photographed is constituted by a repetitive pattern or has a low contrast, erroneous focus detection may be result. In addition, the comparison data is calculated while the pixels are shifted one by one, i.e., the comparison data is obtained not continuously but stepwise. Therefore, if the contrast of an object to be photographed is low, a portion at which the comparison data is minimized is not always a portion having the highest correlation degree.

For this reason, in a conventional apparatus, focus detection is not always accurately performed when an object to be photographed is as described above.

Meanwhile, in the phase difference system of this type, an offset amount having a smaller value than a pixel pitch of an image sensor cannot be obtained. Therefore, conventionally, a portion having the highest correlation degree is obtained by interpolation calculation, and a defocus amount is calculated on the basis of the calculated portion (Japanese Patent Laid-Open No. 60-243618).

In this conventional interpolation calculation, three smallest comparison data are selected from the comparison data, and a portion having the highest correlation degree is obtained on the basis of the selected comparison data. However, reliabilities obtained when the three data are used for interpolation calculation are different from each other. That is, the smallest comparison data has a highest reliability, and a reliability is degraded as a value of the data is increased. Therefore, these three data cannot be similarly used. For this reason, according to the conventional interpolation method in which the third smallest data is similarly used as the other two data, the reliability of a calculation result is degraded.

SUMMARY OF THE INVENTION

The present invention has been made in consideration of the above situation and has as its object to positively obtain a portion having the highest correlation degree of two image signals to be compared in a focus detecting apparatus according to a phase difference system.

In order to achieve the above object of the present invention, there is provided a focus detecting apparatus for a camera, comprising first and second light-receiving means for receiving first and second images formed by light bundle received from an object to be photographed through first and second portions of a photographing lens divided by a face including an optical axis thereof and outputting image signals corresponding to light distribution patterns of the images, respectively, and correlation detecting means for detecting portions having the highest correlation degree of the two images in accordance with the image signals, thereby performing focus detection of the photographing lens on the basis of a detection result of the correlation detecting means, wherein the correlation detecting means detects the portions having the highest correlation degree using at least two different methods.

In addition, there is provided a focus detecting apparatus for a camera, comprising first and second light-receiving means for receiving first and second images formed by light bundle received from an object to be photographed through first and second portions of a photographing lens divided by a face including an optical axis thereof and outputting image signals corresponding to light distribution patterns of the images, respectively, correlation detecting means for detecting portions having the highest correlation degree of the two images in accordance with the image signals, interpolation calculating means for performing interpolation calculation for the portions having the highest correlation degree detected by the correlation detecting means on the basis of autocorrelation data of the two image signal outputs and the smallest and second smallest values of the comparison data, and defocus amount calculating means for calculating a defocus amount of the photographing lens on the basis of the calculated value of the interpolation calculating means.

BRIEF DESCRIPTION OF THE DRAWINGS

FIGS. 2A and 2B are flow charts for explaining an operation of the apparatus in FIG. 1;

FIG. 3 is a graph for explaining a method of detecting a portion having the highest correlation degree; and FIG. 4 is a view for explaining interpolation calculation.

DETAILED DESCRIPTION OF THE PREFERRED EMBODIMENT

The present invention will be described below with reference to the accompanying drawings.

Figure 1:
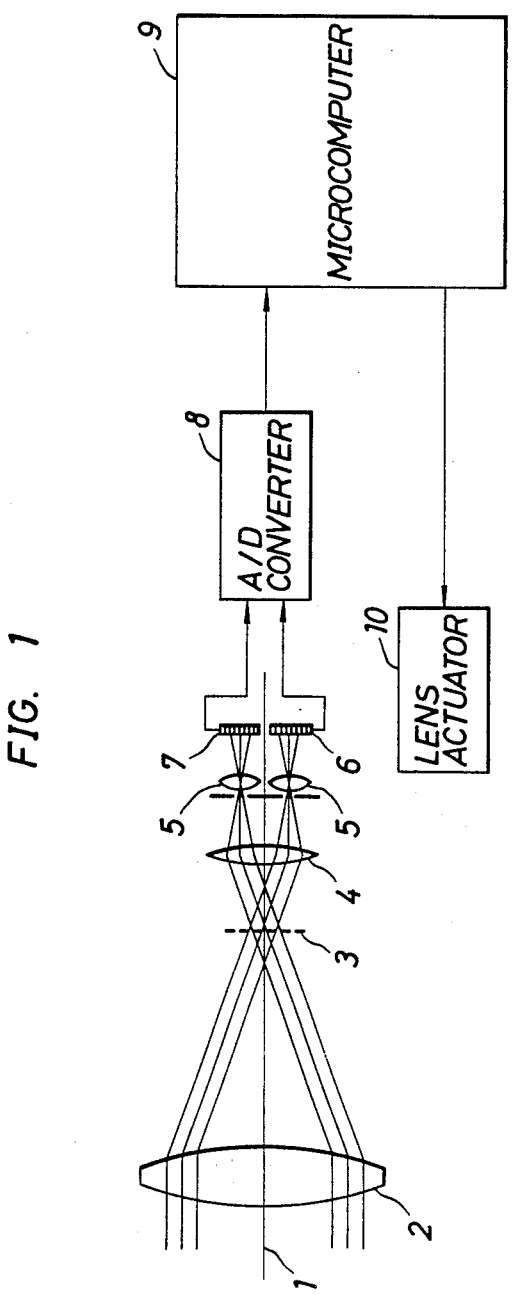
FIG. 1 is a block diagram of an embodiment of a focus detecting apparatus according to the present invention.

FIG. 1 shows an embodiment of a focus detecting apparatus for a camera according to the present invention. In FIG. 1, reference numeral 1 denotes an optical axis of a photographing lens 2; 3, a film equivalent surface; 4, a condenser lens; 5, a reimaging lens for dividing a light beam received from an object to be photographed through the photographing lens 2 and the condenser lens 4; 6 and 7, CCD line sensors each having 31 photodiode cells as pixels; 8, an A/D converter for converting analog image signals from the line sensors 6 and 7 into digital values; 9, a microcomputer for receiving an image signal from the A/D converter 8 to detect a portion having the highest correlation degree, thereby calculating a defocus amount; and 10, a lens actuator for moving the photographing lens 2 by a command from the microcomputer in accordance with a defocus amount.

Figure 2B:
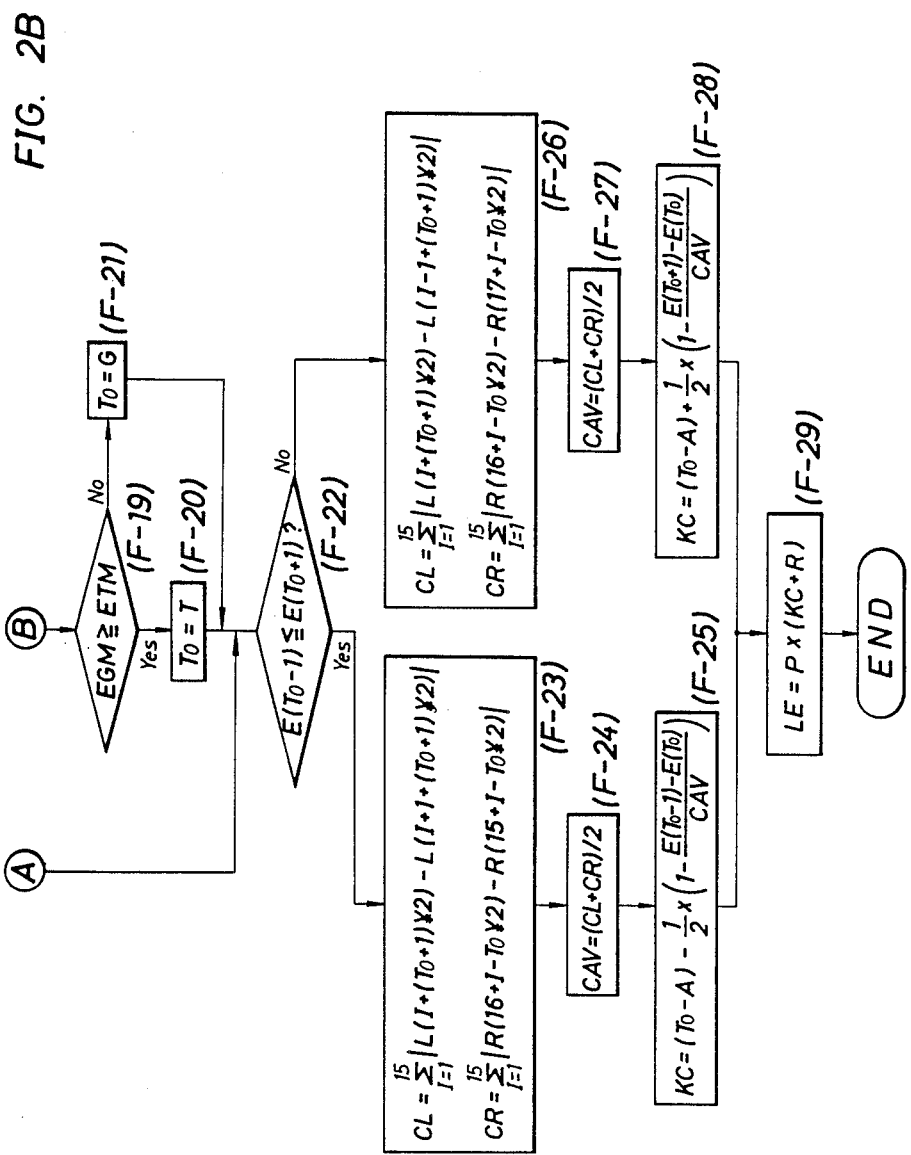

Referring to flow charts in FIGS. 2A and 2B, a focus detection operation will be described below.

First, the line sensors 6 and 7 are driven in accordance with a command from the microcomputer 9, and images formed on the line sensors 6 and 7 are converted into image signals, digitized by the A/D converter 8, and then output to the microcomputer 9. In the microcomputer 9, pixel outputs of pixels (1st to 31st) of the line sensor 6 are stored in a RAM as L(1) to L(31), and pixel outputs of pixels (1st to 31st) of the line sensor 7 are stored as R(1) to R(31) (F-1).

Then, the microcomputer 9 executes calculation represented by the following equations (F - 2):

$$E(0) = \sum_{J=1}^{15} |L(J) - R(J+16)| \quad (1)$$

$$E(I-1) = \sum_{J=1}^{15} |L(J+I/2) - R(16+J-(I-2)/2)|$$

$$E(I) = \sum_{J=1}^{15} |L(J+I/2) - R(16+J-I/2)|$$

(where I = 2, 4, 6, 8, 10, ..., 32)

When numerals are actually substituted, the following equations are obtained:

$$E(0) = |L(1) - R(17)| + |L(2) - R(18)| + \ldots + |L(15) - R(31)|$$

$$E(1) = |L(2) - R(17)| + |L(3) - R(18)| + \ldots + |L(16) - R(31)|$$

$$E(2) = |L(2) - R(17)| + |L(3) - R(17)| + \ldots + |L(16) - R(30)|$$

$$\vdots$$

$$E(32) = |L(17) - R(1)| + |L(18) - R(2)| + \ldots + |L(31) - R(15)|$$

That is, in E(0), a total sum of the absolute value of an output difference between L(1) and R(17), that of an output difference between L(2) and PR(18), ..., and that of an output difference between L(15) and R(31) is obtained. In E(1), a total sum of the absolute value of an output difference between L(2) and R(17), that of an output difference between L(3) and R(18), and that of an output difference between L(16) and R(31) is obtained. This is sequentially repeated until E(32) is obtained. In this case, a suffix of E represents the shift amount, and E(I) represents the comparison data. The comparison data E(I) is used in the following calculation and therefore is stored in the RAM.

When the comparison data E(I) is minimized, the two images coincide with each other. Therefore, a shift amount at this time is obtained, and an offset amount from an in-focus position is calculated in accordance with the shift amount. This is the conventional method.

However, in the present invention, the comparison data E(0) to E(32) obtained by equation (1) are used to perform the following equations (F-3 and F-4):

$$C(I) = E(I-1) - E(I) + E(I+2) - E(I+1)$$

$$I = 1 \text{ to } 30 \quad (2)$$

$$Q(I) = E(I) + E(I+1)$$

$$I = 1 \text{ to } 30 \quad (3)$$

where C(I) becomes a maximum value when images on pixel arrays to be compared have contrast and a large change ratio, and Q(I) becomes a minimum value when the images on the pixel arrays to be compared are similar to each other. Therefore, when C(I) is maximized or Q(I) is minimized, the highest correlation degree is obtained.

Therefore, a maximum value $C(I)_{MAX}$ of C(I) and a minimum value Q MIN of Q(I) are obtained, and shift amounts I at this time are defined as G and T, respectively (F-5 and F-6). Then, the comparison data is accessed again using G and T, and values of E(G) and E(G +1) and those of E(T) and E(T+1) are compared with each other, respectively (F-7 and F-8). As a result, the smaller comparison data are replaced with G and T, respectively (F-9 and F-10). This is because which one of the comparison data is larger is not determined from equations (2) and (3).

Note that a method of obtaining G and T is not limited to above equations (2) and (3) but other equations may be used as long as G is obtained when the change ratio of the comparison data is maximized and T is obtained when the comparison data is minimized. G and T coincide with each other when on object to be photographed is normal. However, when an object to be photographed has low contrast or a repetitive pattern, G and T do not always coincide with each other.

Then, the microcomputer 9 checks whether G and T coincide with each other (F-11). If G=T, the flow advances to the following interpolation calculation (F-22). If G≠T, a camera itself may display that focus detection cannot be performed so that an object to be photographed is processed without focus detection. However, in this embodiment, calculation is further performed to check which shift amount has a higher reliability.

First, minimum values EGM1 and ETM1 of the comparison data predicted on the basis of the shift amounts G and T are obtained by the following equations:

$$EGM1 = E(G) - |\{E(G+1) - E(G-1)\}/2|$$

$$ETM1 = E(T) - |\{E(T + 1) - E(T - 1)\}/2| \qquad (4)$$

FIG. 3 shows EGM1 and ETM1, and EGM1 will be described below. First, $E(G-1)$ is compared with $E(G+1)$, and a larger one, i.e., $E(G-1)$ is connected to $E(G)$ through a straight line D. A straight line F having the same absolute value of inclination as that of the straight line D and a sign opposite to that of the straight line D is drawn to pass $E(G+1)$. An intersection P between the straight lines D and G is the predicted minimum value EGM1. ETM1 can be similarly obtained.

EGM1 and ETM1 are predicted minimum values of the comparison data located near G and T, respectively. The predicted minimum values are reduced when the two image patterns highly coincide with each other. However, the predicted minimum values are reduced also when the contrast of the image patterns to be compared is low. Therefore, ETM1 and ETM1 cannot be simply compared with each other. The highest reliability is obtained at a position at which the predicted minimum value is small and the change ratio of the comparison data is large around the minimum value.

A change amount of the comparison data is obtained as a difference between a larger one of the comparison data before and after $E(G)$ or $E(T)$ and $E(G)$ or $E(T)$. Therefore, the comparison data before and after $E(G)$ and $E(T)$ are compared with each other, respectively (F-13 and F-14). In accordance with comparison results, correlation indices EGM and ETM corresponding to ETM1 and ETM1 are calculated by the following equation (F-15 to F-18).

when $E(G - 1) \geq E(G + 1)$, \qquad (5)

$EGM = EGM1/(E(G - 1) - E(G))$ when $E(G - 1) < E(G + 1)$, $EGM = EGM1/(E(G + 1) - E(G))$ when $E(T - 1) \geq E(T + 1)$, $ETM = ETM1/(E(T - 1) - E(T))$ when $E(T - 1) < E(T + 1)$, $ETM = ETM1/(E(T + 1) - E(T))$ EGM and ETM obtained as described above are reduced as the predicted minimum values EGM1 and ETM1 are reduced and the change ratio of the comparison data around the minimum values is increased. Therefore, EGM and ETM are compared with each other (F-19). When ETM is smaller, a shift amount $T_o$ having the highest correlation degree is determined to be T (F-20). When EGM is smaller, a shift amount $T_o$ having the highest correlation degree is determined to be G (F-21). Then, the flow advances to interpolation calculation.

In this manner, the shift amount $T_o$ having the high correlation degree is obtained. Actually, the highest correlation degree is obtained at the point P slightly separated from G or T as shown in FIG. 3. Interpolation calculation is performed to obtain the point P.

In conventional interpolation calculation, the intersection P is obtained from three points $E(T_o+1)$, $E(T_o)$, and $E(T_o+1)$ shown in FIG. 4 (Japanese Patent Laid-Open No. 60-243618). FIG. 4 shows a relationship obtained when $E(T_o-1) < E(T_o+1)$, and therefore the point P is located between $E(T_o-1)$ and $E(T_o)$. At this time, however, since $E(T_o+1)$ is farther away from the point P than $E(T_o-1)$ is, values of $E(T_o-1)$ and $E(-T_o+1)$ cannot be similarly used in interpolation calculation. For this reason, it is preferred to perform interpolation between the two comparison data of $E(T_o-1)$ and $E(T_o)$ and the two image sensor arrays used by calculating the comparison data.

Therefore, in this embodiment, $E(T_o)$ and one of $E(T_o-1)$ or $E(T_o+1)$ which is closer to the point P are used to perform interpolation calculation.

That is, $E(T_o-1)$ is compared with $E(T_o+1)$ (F-22). If $E(T_o+1)$ is larger, the following calculation is performed (F-23):

$$CL = \sum_{I=1}^{15} |L(I + (T_o + 1) \yen 2) - L(I + 1 + (T_o + 1) \yen 2)| \qquad (6)$$

$$CR = \sum_{I=1}^{15} |R(16 + I - T_o \yen 2) - R(15 + 1 - T_o \yen 2)|$$

where "¥" is a division operator of an integer. Therefore, "¥ 2" means dividing by 2 and rounding fractions below the decimal point of the quotient to obtain an integer. Each of CL and CR which is a calculation result of equation (6) is autocorrelation data obtained by shifting its image pattern by one. In order to average the obtained data, the following calculation is performed (F-24):

$$CAV = (CL + CR)/2 \qquad (7)$$

(7) The average value CAV represents a sum of a difference $h_1$ between $E(T_o-1)$ and the point P and a difference $h_2$ between $E(T_o)$ and the point P $(CAV = h_1 + h_2)$.

Using the average value CAV, an offset amount KC from an in-focus position is calculated by the following equation (F-25):

$$KC = (T_o - A) + \tfrac{1}{2}\left(1 - \frac{E(T_o - 1) - E(T_o)}{CAV}\right) \qquad (8)$$

where A is a shift amount in an in-focus state determined by an optical system.

Meanwhile, if $E(T_o-1)$ is determined to be larger as a result of comparison between $E(T_o-1)$ with $E(-T_o+1)$, the autocorrelation data CL and CR are obtained as follows, respectively:

$$CL = \sum_{I=1}^{15} |L(I + (T_o + 1)\yen 2) - L(I - 1 + (T_o + 1)\yen 2)| \qquad (9)$$

$$CR = \sum_{I=1}^{15} |R(16 + I - T_o \yen 2) - R(17 + I - T_o \yen 2)|$$

Similarly, the average value CAV is calculated by equation (7) (F-27), and the offset amount KC from the in-focus position is calculated by the following equation (F-28):

$$KC = (T_o - A) + \frac{1}{2}\left(1 - \frac{E(T_o + 1) - E(T_o)}{CAV}\right) \quad (10)$$

Lastly, in order to convert the offset amount KC into movement of the lens, the following equation is calculated to obtain a defocus amount LE (F-29):

$$LE = P(KC + R) \quad (11)$$

where P is a movement amount of the lens corresponding to one shift and R is a correction amount (a value converted into a shift amount) of the individual camera. In this manner, focus detection calculation is completed, and the photographing lens 2 is moved by the actuator 10 in correspondence to a calculation result to finish focusing.

In the above embodiment, focus detection calculation has been described. However, when a focal length of the lens 1 in FIG. 1 is f, a distance between principal points of the lens 2 is $\overline{HH'}$, and a distance between the second principal point of the photographing lens to the focal point in 0 shift is B, a distance R from the focal point to an object to be photographed is given by:

$$R = \overline{HH'} + B + \frac{f(B + LE)}{B + LE - f} \quad (12)$$

The distance to an object to be photographed can be obtained by calculating the above equation after the above flow. Therefore, the present invention can be used not only as a focus detecting apparatus but also as a distance measuring apparatus by constituting an optical system shown in FIG. 1 in addition to the photographing lens 2.

As has been described above, according to the present invention, portions having the highest correlation degree of two images are detected on the basis of the maximum value of the change ratio of comparison data and the minimum value of the comparison data. Therefore, since the reliability can be improved, the portions having the highest correlation degree of the two images can be detected more positively than in the conventional apparatus especially when an object to be photographed has low contrast. As a result, focus detection can be performed more accurately.

In addition, in interpolation calculation, the portions having the highest correlation degree are obtained by interpolation calculation performed by the interpolation calculating means on the basis of autocorrelation data of two image signal arrays and the smallest and second smallest values of the comparison data, thereby performing focus detection of the photographing lens on the basis of the calculated value. Therefore, since interpolation calculation is performed on the basis of data having high reliability, the reliability of interpolation calculation is improved, and accurate focus detection can be performed.

What I claim is:

1. A focus detecting apparatus for a camera, comprising:

first and second light-receiving means for receiving first and second images formed by a light bundle received from an object to be photographed through first and second portions of a photographing lens and for outputting image signals corresponding to light distribution patterns of said first and second images; and correlation detecting means for detecting the portions of said first and second images representing the highest correlation degree of said first and second images in accordance with the image signals defined in pixel increments to thereby determine the focus position of said photographing lens by detecting the portion having the highest correlation degree using at least one of the following methods (1) and (2):

(1) defining said image signals in pixel increments, determining the difference between said image signals in pixel outputs by shifting receiving means and calculating comparison data by adding the sum of said differences between said image signals to determine the portion of said first and second images producing the maximum comparison data change ratio and (2) detecting the portion of said first and second images producing the minimum comparison data, the correlation detecting means selecting a result of one of the methods (1) and (2) having higher reliability.

2. The apparatus according to claims 1, wherein when the detection results obtained by the methods (1) and (2) differ from each other, said correlation detecting means determines that focus detection is impossible 3. The apparatus according to claim 1, wherein the maximum comparison data change ratio of the comparison data E(I) and the minimum comparison data E(I) being calculated as a maximum of C(I) and a minimum of Q(I), respectively, defined by the following equation:

$$C(I) = E(I - 1) - E(I) + E(I + 2) - E(I + 1)$$
$$Q(I) = E(I) + E(I + 1)$$

where I is a shift is a shift amount of pixels constituting a light-receiving element.

4. The apparatus according to claim 3, wherein when a shift amount obtained when C(I) is maximized is G and a shift amount obtained when Q(I) is minimized is T, if G≠T, predicted minimum values EGM1 and ETM1 of the comparison data are calculated by the following equations:

$$EGM1 = E(G) - \left| \frac{E(G + 1) - E(G - 1)}{2} \right|$$

$$ETM1 = E(T) - \left| \frac{E(T + 1) - E(T - 1)}{2} \right|$$

and correlation indices EGM and ETM corresponding to EGM1 and ETM1 are calculated by the following equations:

when $E(G - 1) \geq E(G + 1)$,
$$EGM = EGM1/(E(G - 1) - E(G))$$
when $E(G - 1) < E(G + 1)$,
$$EGM = EGM1/(E(G + 1) - E(G))$$
when $E(T - 1) \geq E(T + 1)$,
$$ETM = ETM1/(E(T - 1) - E(T))$$
when $E(T - 1) < E(T + 1)$,
$$ETM = ETM1/(E(T + 1) - E(T))$$

when ETM<EGM, a shift amount having the highest correlation degree is determined to be T, and when ETM<EGM, the shift amount having the highest correlation degree is determined to be G.

5. A focus detecting apparatus for a camera, comprising:

first and second light-receiving means for receiving first and second images formed by light bundle received from an object to be photographed through first and second portions of a photographing lens divided by a face including an optical axis thereof and outputting image signals corresponding to light distribution patterns of the images, respectively;

correlation detecting means for detecting portions having the highest correlation degree of the two images in accordance with the image signals;

interpolation calculating means for performing interpolation calculation for the portions having the highest correlation degree detected by said correlation detecting means on the basis of autocorrelation data of the two image signal outputs and the smallest and second smallest values of the comparison data; and defocus amount calculating means for calculating a defocus amount of said photographing lens on the basis of the calculated value of said interpolation calculating means.

6. The apparatus according to claim 5, wherein when the image signals having the highest correlation degree detected by said correlation detecting means are $L_m$ to $L_{m+n}$ and $R_p$ to $R_{p+n}$, respectively, autocorrelation data represented by the following equations are used to perform interpolation calculation:

$$Cl = \sum_{I=0}^{n-1} |L_{m+I} - L_{m+I+1}|$$

$$CR = \sum_{I=0}^{n-1} |R_{p+I} - R_{p+I+1}|$$

where I is a shift amount of pixels constituting a light-receiving element and n is an arbitrary integer.

7. An apparatus according to claim 6, wherein when a shift amount obtained when the portions having the highest correlation degree are detected by said correlation detecting means is $T_o$, the shift amount $T_o$ is interpolated by an interpolation value X obtained by the following equations:

when $E(T_o - 1) \leq E(T_o + 1)$, $$X = \tfrac{1}{2}\left(1 - \frac{E(T_o - 1) - E(T_o)}{(CL + CR)/2}\right)$$

when $E(T_o - 1) > E(T_o + 1)$, $$X = \tfrac{1}{2}\left(1 - \frac{E(T_o + 1) - E(T_o)}{(CL + CR)/2}\right)$$

* * * * *